United States Patent
Klinghult et al.

(10) Patent No.: US 8,305,358 B2
(45) Date of Patent: Nov. 6, 2012

(54) SENSOR, DISPLAY INCLUDING A SENSOR, AND METHOD FOR USING A SENSOR

(75) Inventors: Gunnar Klinghult, Lund (SE); Mats Kleverman, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 639 days.

(21) Appl. No.: 12/368,462

(22) Filed: Feb. 10, 2009

(65) Prior Publication Data
US 2010/0201635 A1 Aug. 12, 2010

(51) Int. Cl.
G06F 3/045 (2006.01)
G08C 21/00 (2006.01)

(52) U.S. Cl. ............ 345/174; 345/173; 178/18.05; 178/18.06

(58) Field of Classification Search .......... 345/173–178; 178/18.05, 18.06, 19.03, 19.04; 307/112–144
See application file for complete search history.

(56) References Cited

U.S. PATENT DOCUMENTS

| | | | | |
|---|---|---|---|---|
| 4,435,616 A * | 3/1984 | Kley | ............ | 178/18.05 |
| 5,369,228 A * | 11/1994 | Faust | ............ | 178/18.05 |
| 5,777,607 A * | 7/1998 | Koolen | ............ | 345/174 |
| 5,915,285 A | 6/1999 | Sommer | | |
| 6,208,332 B1 * | 3/2001 | Ikegami | ............ | 345/174 |
| 8,089,470 B1 * | 1/2012 | Schediwy et al. | ............ | 345/173 |
| 2007/0062739 A1 * | 3/2007 | Philipp et al. | ............ | 178/18.06 |
| 2007/0139391 A1 * | 6/2007 | Bischoff | ............ | 345/173 |
| 2008/0018608 A1 * | 1/2008 | Serban et al. | ............ | 345/173 |
| 2008/0204418 A1 * | 8/2008 | Cybart et al. | ............ | 345/173 |
| 2008/0231605 A1 * | 9/2008 | Yang | ............ | 345/173 |
| 2008/0303797 A1 * | 12/2008 | Grothe | ............ | 345/173 |
| 2008/0316182 A1 * | 12/2008 | Antila et al. | ............ | 345/173 |
| 2009/0020343 A1 * | 1/2009 | Rothkopf et al. | ............ | 178/18.05 |
| 2009/0096763 A1 * | 4/2009 | Hinata | ............ | 345/174 |
| 2009/0140987 A1 * | 6/2009 | Yang | ............ | 345/173 |

(Continued)

FOREIGN PATENT DOCUMENTS

EP 0 348 229 A2 12/1989

(Continued)

OTHER PUBLICATIONS

S.E. Dyer, O.J. Gregory, P.S. Amons and A. Bruins Slot, *Preparation and piezoresistive properties of reactively sputttered indium tin oxide thin films*, Presented at the 22$^{nd}$ International Conference on Metallurgical Coatings and Thin Films (ICMCTF 1995), San Diego, CA, Apr. 24-28, 1995, pp. 279-286.

(Continued)

*Primary Examiner* — Amare Mengistu
*Assistant Examiner* — Gene W Lee
(74) *Attorney, Agent, or Firm* — Renner, Otto, Boiselle & Sklar, LLP (57) ABSTRACT

A sensor includes an insulating support defining a front side; a membrane arranged on the front side of the support, the membrane including at least one layer including a pattern of electrically conductive material; at least one capacitance measuring unit configured for measuring a capacitance between at least a portion of the pattern of one of the at least one layer and its surrounding environment; and at least one resistance measuring unit configured for measuring a resistance between a pair of points of the pattern of one of the at least one layer. A display including the sensor and a method of using the sensor are also disclosed.

15 Claims, 5 Drawing Sheets

U.S. PATENT DOCUMENTS

| | | | |
|---|---|---|---|
| 2009/0152023 A1* | 6/2009 | Yeh et al. | 178/18.05 |
| 2009/0189875 A1* | 7/2009 | Ma | 345/174 |
| 2009/0225051 A1* | 9/2009 | Kuo | 345/173 |
| 2009/0309616 A1* | 12/2009 | Klinghult et al. | 324/686 |
| 2009/0315845 A1* | 12/2009 | Alexander | 345/173 |
| 2010/0078231 A1* | 4/2010 | Yeh et al. | 178/18.05 |
| 2010/0123686 A1* | 5/2010 | Klinghult et al. | 345/178 |
| 2010/0141591 A1* | 6/2010 | Lin | 345/173 |

FOREIGN PATENT DOCUMENTS

| | | |
|---|---|---|
| GB | 2 288 665 A | 10/1995 |
| WO | WO 2005/073834 A2 | 8/2005 |

OTHER PUBLICATIONS

Analog Devices, *CapTouch Programmable Controller for Single Electrode Capacitance Sensors AD7147*, Analog Devices, Inc., Norwood, Massachusetts, U.S.A., Preliminary Technical Data, Jun. 2007—Preliminary version F, 2007, pp. 1-68.

http://en.wikipedia.org/wiki/Wheatstone bridge (web page).

International Search Report, corresponding to PCT/EP2009/060325 mailed Nov. 13, 2009.

Written Opinion, corresponding to PCT/EP2009/060325, mailed Nov. 13, 2009.

* cited by examiner

SENSOR, DISPLAY INCLUDING A SENSOR, AND METHOD FOR USING A SENSOR

TECHNICAL FIELD

The present invention relates to sensors, displays including sensors and methods for using sensors. The sensors may be used in user interfaces and man-machine interfaces for controlling various devices.

BACKGROUND

Touch sensors are known in the art for controlling devices through a user interface or man-machine interface. Touch sensors may work by reacting to the capacitance introduced by a user's finger, or to a change in capacitance caused by the presence of a user's finger.

Figure 6:
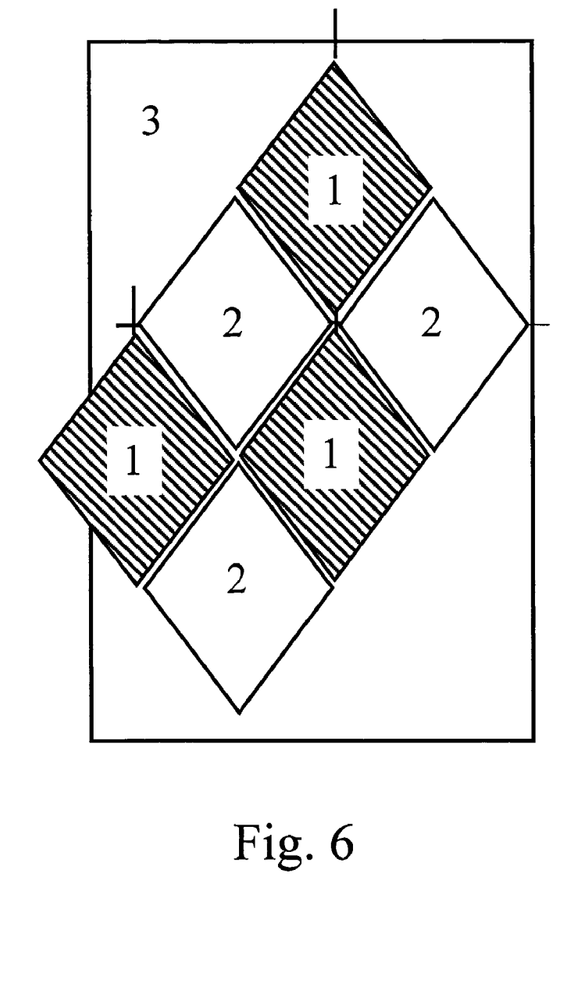
FIG. 6 schematically illustrates a capacitive touch panel.

The front view of an exemplary capacitive touch panel is schematically illustrated in FIG. 6. It includes two layers, a layer labelled "1" and a layer labelled "2". The capacitive components of layer "1" are connected to each other vertically. The capacitive components of layer "2" are connected to each other horizontally. Layer labelled "3" is an insulating plane. This provides a matrix structure enabling to obtain the X and Y coordinates of the location where a user touches the display. It also enables so-called multitouch applications, i.e. applications wherein the users can control graphical applications with more than one finger.

The above-described layers of the exemplary touch panel may include indium tin oxide (ITO).

It is desirable to provide improved sensors, displays and methods to notably allow more flexibility in the operation of user interfaces.

SUMMARY

Such sensors, displays and methods are defined in the independent claims. Advantageous embodiments are defined in the dependent claims.

In one embodiment of the invention, a sensor includes an insulating support defining a front side; a membrane arranged on the front side of the support, the membrane including at least one layer including a pattern of electrically conductive material; at least one capacitance measuring unit configured for measuring a capacitance between at least a portion of the pattern of one of the at least one layer and its surrounding environment; and at least one resistance measuring unit configured for measuring a resistance between a pair of points of the pattern of one of the at least one layer.

In one embodiment, the electrically conductive material is indium tin oxide (ITO). ITO is advantageous since an ITO film structure is already present for implementing the capacitive touch capability in some display panels. Such an ITO structure may therefore be reused, without or without much design alteration. However the invention is not limited to a pattern of ITO. Other electrically conductive materials with similar characteristics may be used. Although, in the following description, it is referred to ITO, it must be understood that ITO can always be replaced by other electrically conductive materials with similar characteristics.

ITO may be used for displays. It is a transparent conducting material which may be used in thin coating form. As a coating, it may be deposited by methods such as electron beam evaporation or a range of sputtering techniques.

ITO is electrically conductive and has piezoresistive properties. A force exerted by a user's finger, hand or other object can therefore be detected and measured by monitoring the change in resistance of the ITO pattern in a layer. For piezoresistive materials, the change in resistance due to a contraction is around one hundred times the change for normal metals. This effect does not depend on changes in length and area. Touch and release, or drag and drop applications for instance may therefore be implemented with a simple configuration.

Here, indium tin oxide (ITO) is defined as a solid solution including indium(III) oxide ($In_2O_3$) and tin(IV) oxide ($SnO_2$). In one embodiment, the ITO includes between 85 and 95% $In_2O_3$, and between 7 and 13% $SnO_2$ by weight. In one embodiment, the ITO includes between 88 and 92% $In_2O_3$, and between 8 and 12% $SnO_2$ by weight.

In one embodiment, the membrane is made of a resilient material. Thus, the sensor may be used repetitively, wherein the same shape or substantially the same shape is recovered between each interaction.

In one embodiment, the sensor is such that the at least one capacitance measuring unit is configured to detect the presence of a finger, hand or other object on the sensor or in the vicinity thereof; and the at least one resistance measuring unit is configured to detect whether a force is exerted by the finger, hand or other object on the sensor.

Therefore, more parameters may be used to control a device through a user interface. Whether a finger, hand or other object is merely present on the sensor or in the vicinity thereof or whether the finger, hand or other object is exerting a force can therefore be used as an input parameter of the user interface. In one embodiment, detecting whether a force is exerted by the finger, hand or other object on the sensor means detecting that a force larger than a threshold value is exerted by the finger, hand or other object on the sensor.

In one embodiment, the sensor is such that the at least one capacitance measuring unit is configured to detect the presence of a finger, hand or other object on the sensor or in the vicinity thereof; and the at least one resistance measuring unit is configured to estimate the force exerted by the finger, hand or other object on the sensor.

Therefore, yet more parameters may be used to control a device through a user interface. Namely the value of the force exerted by the finger, hand or other object on the sensor may also be used as an input parameter of the user interface. In one embodiment, the value of the force is expressed in newton. In one embodiment, the value of the force is expressed in percentage change compared to a reference value.

In one embodiment, the sensor is such that the at least one capacitance measuring unit includes a first capacitance measuring unit configured for measuring a capacitance between a first portion of the pattern of one of the at least one layer and its surrounding environment, and a second capacitance measuring unit configured for measuring a capacitance between a second portion of the pattern of one of the at least one layer and its surrounding environment. In this embodiment, the sensor is further such that the at least one resistance measuring unit includes a first resistance measuring unit configured for measuring a resistance between a pair of points of the first portion of the pattern of one of the at least one layer, and a second resistance measuring unit configured for measuring a resistance between a pair of points of the second portion of the pattern of one of the at least one layer.

With the configuration of this embodiment, the presence of a finger, hand or other object, its position and the force exerted thereby may be used as controlling parameters of a user interface.

In one embodiment, the sensor is such that the at least one capacitance measuring unit is configured to detect the presence of a finger, hand or other object on the sensor or in the vicinity thereof and to estimate the position of the finger, hand or other object on the sensor; and the at least one resistance measuring unit is configured to detect whether a force is exerted by the finger, hand or other object on the sensor.

If the finger, hand or other object is not placed on the sensor but is only in the vicinity thereof, the position of the finger, hand or other object on the sensor may mean, in one embodiment, an estimation of the point on the sensor which is the closest one to the finger, hand or other object.

In one embodiment, the sensor is such that the at least one capacitance measuring unit is configured to detect the presence of a finger, hand or other object on the sensor or in the vicinity thereof and to estimate the position of the finger, hand or other object on the sensor; and the at least one resistance measuring unit is configured to estimate the force exerted by the finger, hand or other object on the sensor.

In one embodiment, the sensor is configured so that one resistance measuring unit is activated when one capacitance measuring unit indicates a change of capacitance exceeding a threshold value. This has the advantage of saving power by not permanently activating the resistance measuring unit. The resistance measurement unit does not need to start until an interrupt from the capacitance measurement unit has indicated the presence of a user's finger, hand or other object.

In one embodiment, the sensor is configured so that the capacitance measurements and the resistance measurements are performed one after the other in sequence. That is, when the capacitance measurement units and resistance measurement units are simultaneously active, capacitance measurements are carried out at time t=0, resistance measurements are carried out at time t=1, new capacitance measurements are carried out at time t=2, and so on. In other words, the capacitance and resistance measurements are multiplexed. This prevents interference from occurring. In another embodiment, separate areas of the membrane are used for the capacitance and resistance measurements respectively.

The invention also relates to a display including a sensor as described above. The sensor membrane is, in one embodiment, arranged somewhere between the actual active display surface and the outer display surface. In one embodiment, there is no air gap between the sensor membrane and the outer display surface. In this embodiment, the succession of layers in the display (stack configuration) may include for instance: (1) actual active display surface, (2) air gap, (3) sensor membrane, (4) glue or tape, and (5) outer display surface (or so-called outer window); or (1) actual active display surface, (2) glue or tape, (3) sensor membrane, (4) glue or tape, and (5) outer display surface. The absence of air gap between the sensor membrane and the outer display surface improves the sensitivity for capacitive measurements. In addition, the smaller the distance between the finger and the sensor membrane, the larger the absolute capacitance obtained when there is a finger on the outer display surface, and the larger the "delta finger", i.e. the difference between the capacitance value obtained when there is a finger and when there is none.

The sensor membrane is, in one embodiment, arranged somewhere between the actual active display surface and the outer display surface, and is not arranged on the outer display surface where it could be in direct contact with a finger. This configuration prevents or reduces the risk of wearing the sensor membrane.

The sensor is, in one embodiment, transparent. Thus, the presence of a finger, hand or other object on the display can be detected; the position of the finger, hand or other object on the display can be estimated (if more than one capacitance measuring units are provided), whether a force is exerted by the finger, hand or other object on the display can be detected; and the force exerted by the finger, hand or other object on the display can be also estimated.

The invention also relates to a method of using a sensor as described above, the method including steps of outputting a signal indicating the presence of a finger, hand or other object on the sensor or in the vicinity thereof; and outputting a signal indicating whether a force is exerted by the finger, hand or other object on the sensor.

The invention also relates to a method of using a sensor as described above, the method including steps of outputting a signal indicating the presence of a finger, hand or other object on the sensor or in the vicinity thereof; and outputting a signal indicating the force exerted by the finger, hand or other object on the sensor.

The invention also relates to a method of using a sensor as described above, the method including steps of outputting a signal indicating the presence of a finger, hand or other object on the sensor or in the vicinity thereof; outputting a signal indicating whether a force is exerted by the finger, hand or other object on the sensor; and outputting a signal indicating an estimation of the two-dimensional position of the finger, hand or other object on the sensor.

The invention also relates to a method of using a sensor as described above, the method including steps of outputting a signal indicating the presence of a finger, hand or other object on the sensor or in the vicinity thereof; outputting a signal indicating the force exerted by the finger, hand or other object on the sensor; and outputting a signal indicating an estimation of the two-dimensional position of the finger, hand or other object on the sensor.

In one embodiment, the method further includes outputting a signal indicating an estimation of the three-dimensional position of the finger, hand or other object on the sensor, based on the signal indicating an estimation of the two-dimensional position of the finger, hand or other object on the sensor, which provides coordinates x and y; and the signal indicating an estimation of the force exerted by the finger, hand or other object on the sensor, which provides coordinate z; wherein coordinates x and y correspond to two distinct directions along the surface of the sensor and coordinate z corresponds a direction perpendicular to the surface of the sensor.

In one, embodiment the membrane is plane or substantially plane. In another embodiment, the membrane is not plane, but curved. In this embodiment, coordinates x, y may be along directions which are tangent to the membrane locally. The coordinate z may be along the direction which is perpendicular to the direction corresponding to the coordinates x, y at one point. Coordinates x, y, z may therefore be local coordinates.

As mentioned above, in the invention ITO can be replaced by other electrically conductive materials with similar characteristics. In one embodiment, an electrically conductive material with similar characteristics as ITO means an electrically conductive material having a negative room-temperature gage factor (the gage factor being defined for instance in S. E. Dyer, O. J. Gregory, P. S. Amons and A. Bruins Slot, *Preparation and piezoresistive properties of reactively sputtered indium tin oxide thin films*, Presented at the 22nd International Conference on Metallurgical Coatings and Thin Films (ICMCTF 1995), San Diego, Calif., Apr. 24-28, 1995, section "1. Introduction", equation (2)). In sub-embodiments, an electrically conductive material with similar characteristics as ITO means an electrically conductive material having a room-temperature gage factor comprised between one of −2 and −1000; −4 and −1000; and −6 and −1000.

In particular, transparent conductive oxides (TCO), conductive polymers, and conductive carbon nanotubes are candidates for replacing ITO. Materials which can be formed as a thin film (e.g. by deposition), and with a large piezoresistive response are preferred.

BRIEF DESCRIPTION OF THE DRAWINGS

Embodiments of the present invention shall now be described, in conjunction with the appended figures, in which.

DETAILED DESCRIPTION

The present invention shall now be described in conjunction with specific embodiments. It may be noted that these specific embodiments serve to provide the skilled person with a better understanding, but are not intended to in any way restrict the scope of the invention, which is defined by the appended claims.

Figure 1:
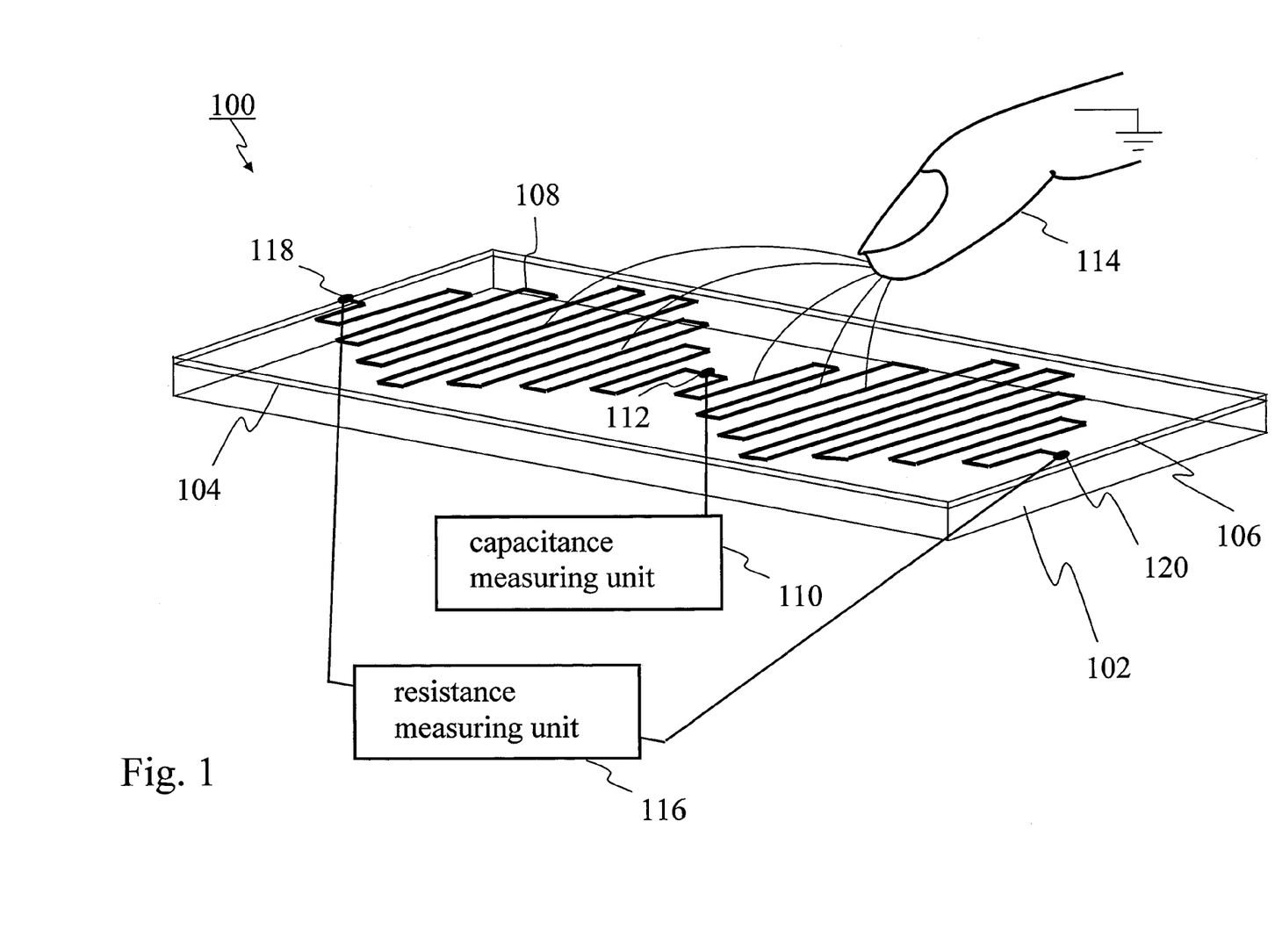
FIG. 1 schematically illustrates a sensor in one embodiment of the invention.

FIG. 1 schematically illustrates a sensor in one embodiment of the invention. The sensor 100 includes an insulating support 102 defining a front side 104. A membrane 106 is arranged on the front side 104 of the insulting support 102. The membrane 106 includes at least one layer including a pattern 108 of indium tin oxide (ITO).

The sensor 100 further comprises a capacitance measuring unit 110 configured for measuring a capacitance between the pattern 108 and its surrounding environment. The capacitance measuring unit 110 is connected to the ITO pattern 108 through a contact point 112. The surrounding environment may include a finger 114, hand or other object, which may modify the capacitance measured by the capacitance measuring unit 110, when active.

For instance, the so-called CapTouch Programmable Controller for Single Electrode Capacitance Sensors AD7147 manufactured by Analog Devices, Norwood, Mass., U.S.A. (see Data Sheet, *CapTouch™ Programmable Controller for Single Electrode Capacitance Sensors*, AD7147, Preliminary Technical Data, 06/07—Preliminary version F, 2007 published Analog Devices, Inc) may be used as capacitance measuring unit 110. In particular, page 11 of the data sheet provides explanations of a possible mode of operation of the capacitance measuring unit 110.

The capacitance measuring unit 110 is not limited to the above-described exemplary AD7147 capacitance measuring unit. Other capacitance measuring units 110 may be used.

The sensor 110 also includes a resistance measuring unit 116 configured for measuring the resistance between a pair of points 118, 120 of the ITO pattern 108.

ITO has good piezoresistive properties as explained in S. E. Dyer, O. J. Gregory, P. S. Amons and A. Bruins Slot, *Preparation and piezoresistive properties of reactively sputtered indium tin oxide thin films*, Presented at the 22nd International Conference on Metallurgical Coatings and Thin Films (ICM-CTF 1995), San Diego, Calif., Apr. 24-28, 1995: "Room-temperature gage factors $R/R_o$ as large as −77.71 were measured on patterned ITO films. These gage factors are considerably larger than those reported for refractory metal alloys. A large, negative piezoresistive response (negative gage factor) was observed for all ITO films similar to the responses observed for n-type silicon. The piezoresistive response was reproducible and linear, with little or no hysteresis observed with strains up to 700 $\mu_{in\ in}^{-1}$."

In the embodiment illustrated in FIG. 1, the capacitance measuring unit 110 is configured to detect the presence of a finger 114, hand or other object at the surface of or in the vicinity or proximity of the surface of the sensor 100. A cover sheet of plastic or glass (not illustrated) may be arranged at the surface of the sensor 110 on top of the membrane 106. The cover sheet of plastic or glass may act as a protecting element. The resistance measuring unit 116 is configured to detect whether a force is exerted by the finger 114, hand or other object, when the finger 114, hand or other object is placed at the surface of the sensor 100. The resistance measuring unit 116 may also be configured to estimate the force exerted by the finger 114, hand or other object, when the finger 114, hand or other object is placed at the surface of the sensor 100. The membrane 106, which is in one embodiment resilient, is bent due to the force exerted by the finger 114, hand or other object on the surface of the sensor 100, and the length of the ITO pattern 108 between the contact points 118 and 120 is modified. Thanks to the piezoresistive properties of the ITO conductive pattern, the resistance is modified and can be measured by the resistance measuring unit 116, so that an exerted force can be detected and the exerted force can further be estimated.

A signal output (not illustrated) of the resistance measuring unit 116 representing the resistance may be converted to a signal representing a force. Depending on whether a force is exerted in the sensor 100 and depending on the force exerted on the sensor 100, different actions may be triggered in the control logic of the user interface. For instance, if the measured force exceeds a predetermined threshold, a first action is carried out. If the measured force does not exceed the predetermined threshold, a second action is carried out.

In the sensor 100 illustrated in FIG. 1, the force measurement is one channel measurement. Namely, one force measurement is obtained for the whole panel by the resistance measuring unit 116, while the finger position is provided by the capacitance measuring unit 110. In one embodiment, several force measurements are made in different portions of the membrane.

Figure 5:
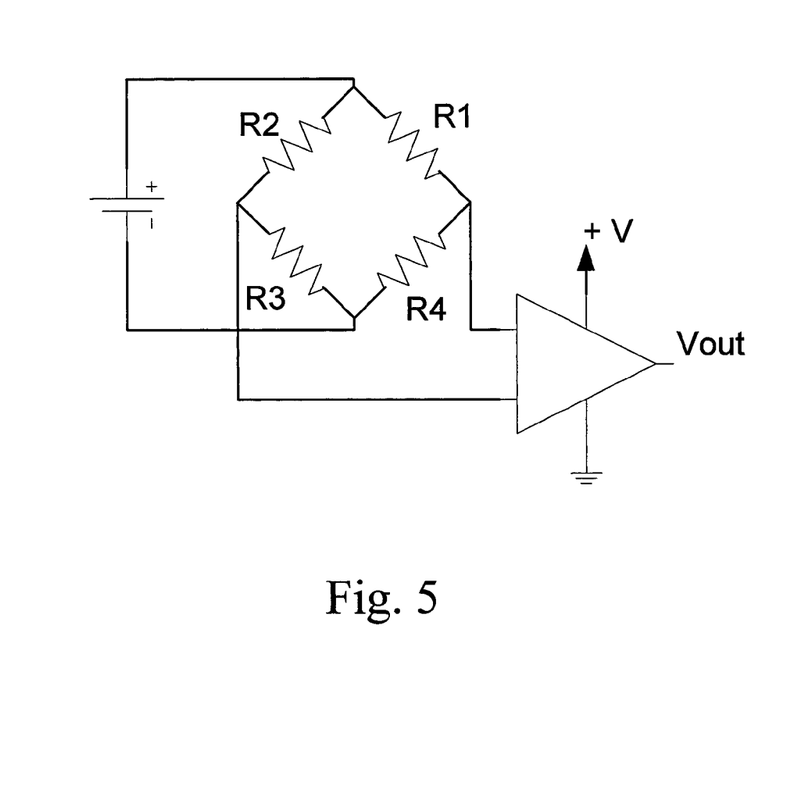
FIG. 5 is a circuit diagram of a Wheatstone bridge which is used, in one embodiment, to implement the resistance measuring unit.

The resistance measuring unit 116 configured to measure the electrical resistance between a pair of points 118, 120 of the ITO pattern 108 may for instance be implemented using a Wheatstone bridge. An exemplary circuit diagram of such a circuit is shown in FIG. 5. Referring to FIG. 5, the ITO pattern 108, the electrical resistance to be measured, may be connected as R1. The amplifier may be any type of suitable operational amplifier. The resistance measuring unit 116 is not however limited to this exemplary implementation based on a Wheatstone bridge. Other resistance measuring units 116 may be used.

In one embodiment, the glass or plastic window in front of a display may be covered with layers of ITO and then acts as a membrane 106. The force from the user's finger, hand or other object causes a strain in this membrane 106 which can be measured by the piezoresistive resistor structure. This makes it possible to measure the force from the user's finger 114, hand or other object.

The sensitivity may vary depending on where the force is applied. This is however predictable and can be compensated using a look-up table where the X and Y coordinates are used as input parameters.

In many applications, only a relative measurement of the force is required. This means that calibration is not needed and changes in sensitivity depending on different stiffness in the display (e.g. due to temperature changes) on different positions may be successfully handled.

A controlling unit (not illustrated) may be further provided for controlling the activation of the capacitance measuring unit 110 and the resistance measuring unit 116.

In one embodiment, the controlling unit is configured to activate, i.e. to switch on, the resistance measuring unit 116 only when the capacitance measuring unit 110 outputs a signal indicating the detection of a finger 114, hand or other object on the surface of the sensor 100. As mentioned above, this configuration saves power by not permanently activating the resistance measuring unit 116. The resistance measurement unit 116 does not need to start until an interrupt from the capacitance measurement unit 116 indicates the presence of a finger, hand or other object on the sensor 100. The capacitance measuring unit 110 may output a signal indicating the detection of a finger 114, hand or other object on the surface of the sensor 100 when the change in measured capacitance exceeds a predetermined threshold.

Figure 2:
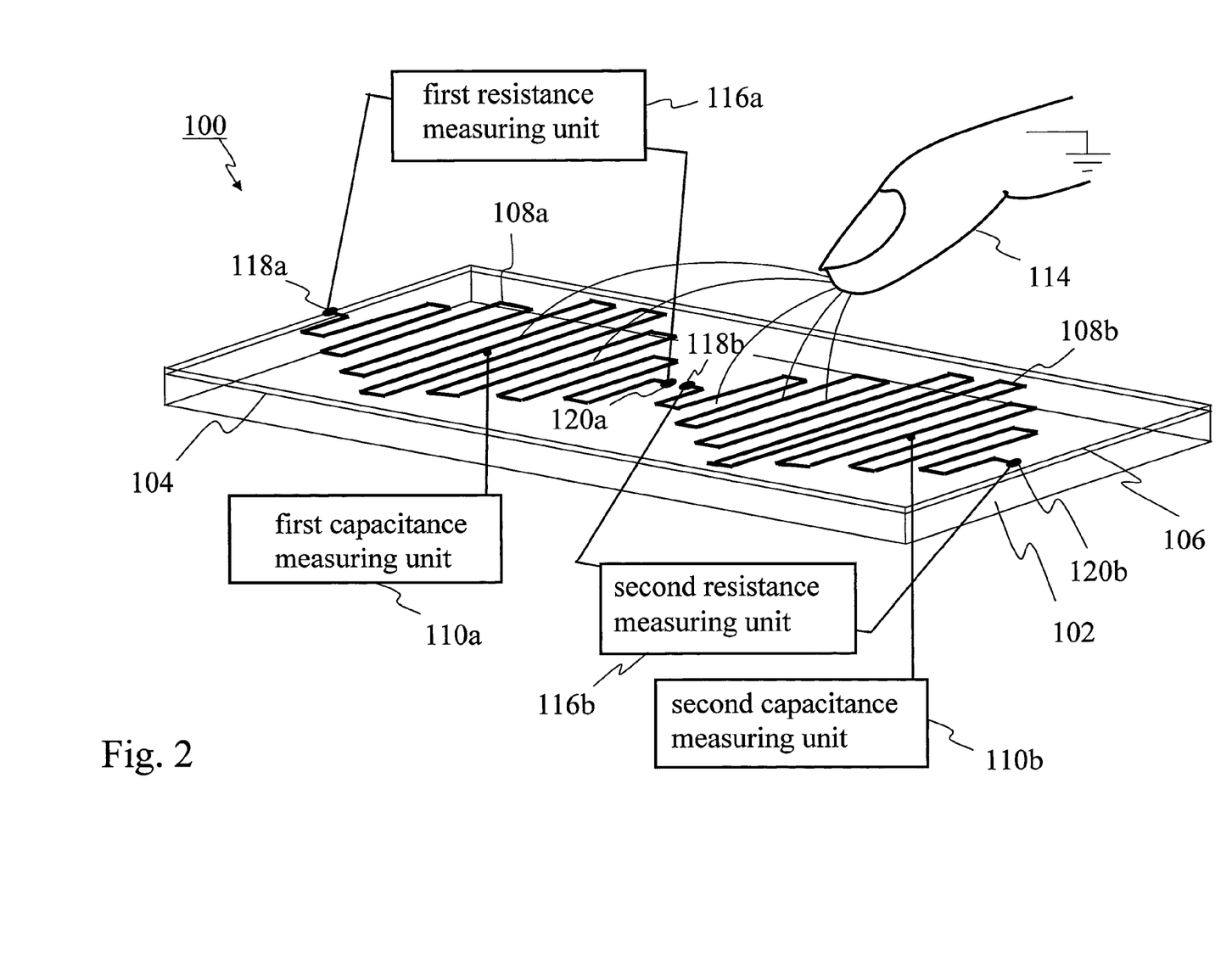
FIG. 2 schematically illustrates a sensor in one embodiment of the invention, wherein the sensor includes more than one capacitance measuring unit and more than one resistance measuring unit.

FIG. 2 schematically illustrates a sensor 100 in another embodiment of the invention. On the front side 104 of the insulating support 102, a membrane 106 includes a pattern 108a, 108b of ITO. The pattern 108a, 108b includes a first portion 108a and a second portion 108b. A first capacitance measuring unit 110a is electrically connected to the ITO portion 108a to measure the capacitance between the portion 108a and its surrounding environment, which may at one point in time include a finger 114, hand (not illustrated) or other object (not illustrated). A first resistance measuring unit 116a is connected through contact points 118a, 120a to measure the resistance between the pair of contact points 118a, 120a of the pattern portion 108a. Thus, a finger 114, hand or other object can be detected in the proximity of the portion 108a by the first capacitance measuring unit 110a, and the force exerted by the finger 114, hand or other object on the membrane 106 can be estimated by the first resistance measuring unit 116a.

A second capacitance measuring unit 110b is electrically connected to a second ITO pattern 108b in order to detect the presence of a finger 114 in the vicinity of the portion 108b. Furthermore, a second resistance measuring unit 116b is connected between two contact points 118b, 120b in order to measure the resistance between the pair of contact points 118b, 120b of the second portion 108b. Thus, not only the presence of a finger 114 on, or in the vicinity or proximity of, the sensor 100 can be detected and the force exerted by the finger 114 on the sensor 100 can be estimated, but also the position of the finger 114 on the sensor 100.

In other words, a plurality of presence detections and a plurality of force detections or measurements can be made at a plurality of distinct portions of the membrane 106.

Alternatively (not illustrated in FIG. 2), one force measurement may be obtained only by one resistance measuring unit 106, while the finger 114 position is provided by a plurality of capacitance measuring units 110.

Figure 3:
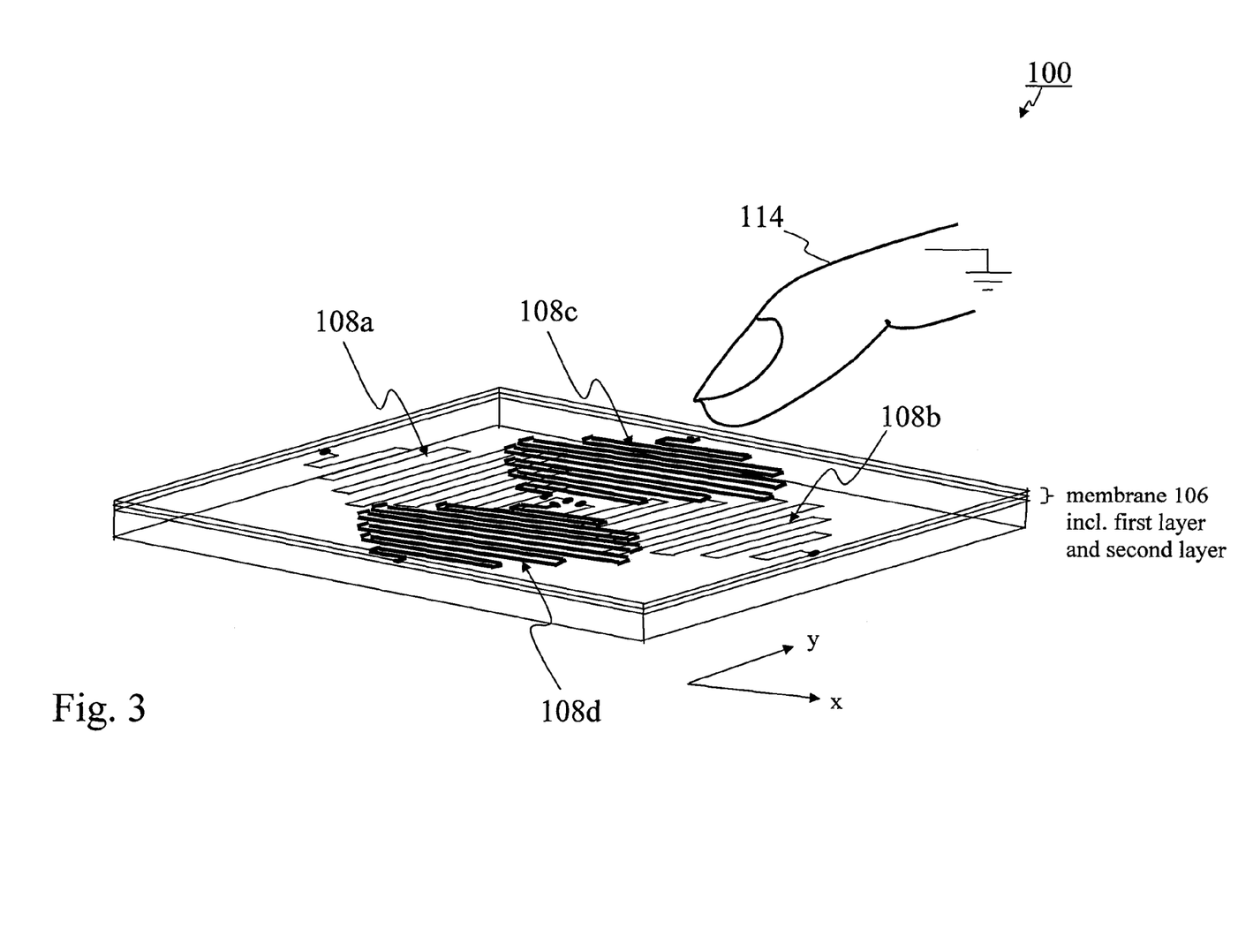
FIG. 3 schematically illustrates a sensor in one embodiment of the invention, wherein ITO patterns are arranged on more than one layer.

FIG. 3 schematically illustrates a sensor 100 in another embodiment of the invention. The membrane 106 is made of two layers. Each layer includes an ITO pattern 108. The first layer includes a first ITO pattern portion 108a and a second ITO pattern portion 108b. The second layer includes a third ITO pattern portion 108c and a fourth ITO pattern portion 108d. Capacitance measuring units (not illustrated in FIG. 3) are provided to measure the capacitance between each ITO pattern portion 108a, 108b, 108c, 108d and their respective surrounding environment. Resistance measuring units (not illustrated in FIG. 3) are provided to measure the resistance between the contact points of each ITO pattern portion in order to detect a force and/or estimate a force exerted by a finger 114 on the membrane 106 in the region of the corresponding ITO pattern portion 108a, 108b, 108c, 108d.

The capacitance measuring units electrically connected to each of the ITO pattern portions 108a, 108b provide an indication of the position of the finger 114 on the membrane along the x direction (as indicated in FIG. 3). The capacitance measuring units electrically connected to each of the ITO pattern portions 108c, 108d provide an indication of the position of the finger 114 on the membrane 116 in the y direction.

The membrane 106 may include more than two layers. The ITO pattern portions may be in the form of a serpentine (as illustrated in FIG. 3) or of any other form. The number of ITO pattern portions on each layer may be different.

Figure 4:
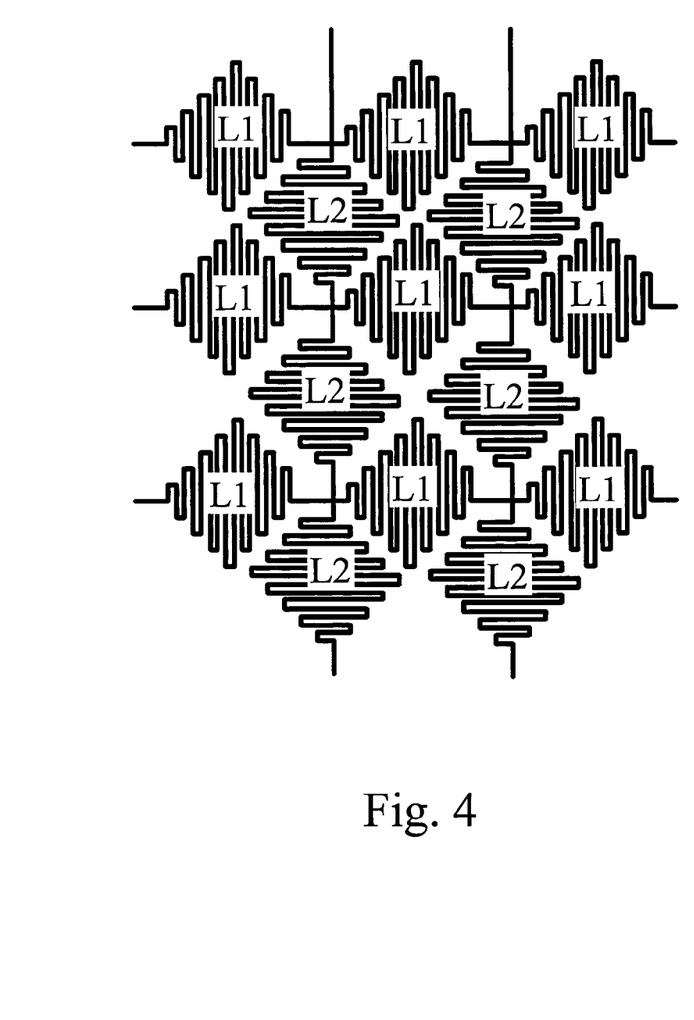
FIG. 4 schematically illustrates the front side of a sensor in one embodiment of the invention.

FIG. 4 is a schematic front view of layers of a membrane 106 of a sensor 100 in one embodiment of the invention. The three rows of ITO pattern portions labelled "L1" are each associated with one capacitance measuring unit and one resistance measuring unit. Each column of ITO pattern portions labelled by "L2" is associated with one capacitance measuring unit and one resistance measuring unit. From the value of capacitance and resistance measurements for each row and column, the position of a finger on the membrane and the force exerted by the finger thereon may be estimated.

Thus, the sensor in one embodiment has a structure similar to a strain gauge using the piezoresistive effect in the ITO layers, which is combined with the capacitive sensing.

The physical entities according to the invention and/or its embodiments, including the capacitance measuring units, the resistance measuring units and the controlling unit, may comprise or store computer programs including instructions such that, when the computer programs are executed on the physical entities, steps, procedures and functions of these units are carried out according to embodiments of the invention. The invention also relates to such computer programs for carrying out the function of the units, and to any computer-readable medium storing the computer programs for carrying out methods according to the invention.

Where the terms "capacitance measuring unit", "resistance measuring unit" and "controlling unit" are used in the present document, no restriction is made regarding how distributed these elements may be and regarding how gathered these elements may be. That is, the constituent elements of the above capacitance measuring units, resistance measuring units and controlling units may be distributed in different software or hardware components or devices for bringing about the intended function. A plurality of distinct elements or units may also be gathered for providing the intended functionalities.

Any one of the above-referred units of a sensor 100 may be implemented in hardware, software, field-programmable gate array (FPGA), application-specific integrated circuit (ASICs), firmware or the like.

In further embodiments of the invention, any one of the above-mentioned and/or claimed capacitance measuring units, resistance measuring units and controlling units is replaced by capacitance measuring means, resistance measuring means and controlling means respectively, or by a capacitance measurer, resistance measurer and controller respectively, for performing the functions of the capacitance measuring units, resistance measuring units and controlling units.

In further embodiments of the invention, any one of the above-described steps may be implemented using computer-readable instructions, for instance in the form of computer-understandable procedures, methods or the like, in any kind of computer languages, and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. Sensor including
an insulating support defining a front side;
a membrane arranged on the front side of the support, the membrane including at least one layer including a pattern of electrically conductive material representing an electrode;
at least one capacitance measuring unit configured for measuring a capacitance between at least a portion of the electrode of one of the at least one layer and its surrounding environment; and
at least one resistance measuring unit configured for measuring a resistance between a pair of points of a continuous portion of the electrode of one of the at least one layer.

2. Sensor of claim 1, wherein the electrically conductive material is indium tin oxide.

3. Sensor of claim 1, wherein
the at least one capacitance measuring unit is configured to detect the presence of a finger, hand or other object on the sensor or in the vicinity thereof; and
the at least one resistance measuring unit is configured to detect whether a force is exerted by the finger, hand or other object on the sensor.

4. Sensor of claim 1, wherein
the at least one capacitance measuring unit is configured to detect the presence of a finger, hand or other object on the sensor or in the vicinity thereof; and
the at least one resistance measuring unit is configured to estimate the force exerted by the finger, hand or other object on the sensor.

5. Sensor of claim 1, wherein the at least one capacitance measuring unit includes
a first capacitance measuring unit configured for measuring a capacitance between a first continuous portion of the electrode of one of the at least one layer and its surrounding environment, and
a second capacitance measuring unit configured for measuring a capacitance between a second continuous portion of the electrode of one of the at least one layer and its surrounding environment; and
the at least one resistance measuring unit includes
a first resistance measuring unit configured for measuring a resistance between a pair of points of the first continuous portion of the electrode of one of the at least one layer, and
a second resistance measuring unit configured for measuring a resistance between a pair of points of the second continuous portion of the electrode of one of the at least one layer.

6. Sensor according to claim 5, wherein
the at least one capacitance measuring unit is configured to detect the presence of a finger, hand or other object on the sensor or in the vicinity thereof and to estimate the position of the finger, hand or other object on the sensor; and
the at least one resistance measuring unit is configured to detect whether a force is exerted by the finger, hand or other object on the sensor.

7. Sensor according to claim 5, wherein
the at least one capacitance measuring unit is configured to detect the presence of a finger, hand or other object on the sensor or in the vicinity thereof and to estimate the position of the finger, hand or other object on the sensor; and
the at least one resistance measuring unit is configured to estimate the force exerted by the finger, hand or other object on the sensor.

8. Sensor according to claim 1, configured so that one resistance measuring unit is activated when one capacitance measuring unit indicates a change of capacitance exceeding a threshold value.

9. Sensor according to claim 1, configured so that the capacitance measurements and the resistance measurements are performed one after the other in sequence.

10. A display including a sensor according to claim 1.

11. The sensor according to claim 1, wherein the sensor
outputs a signal indicating the presence of a finger, hand or other object on the sensor or in the vicinity thereof; and
outputs a signal indicating whether a force is exerted by the finger, hand or other object on the sensor.

12. The sensor according to claim 1, wherein the sensor
outputs a signal indicating the presence of a finger, hand or other object on the sensor or in the vicinity thereof; and
outputs a signal indicating the force exerted by the finger, hand or other object on the sensor.

13. The sensor according to claim 5, wherein the sensor
outputs a signal indicating the presence of a finger, hand or other object on the sensor or in the vicinity thereof;
outputs a signal indicating whether a force is exerted by the finger, hand or other object on the sensor; and
outputs a signal indicating an estimation of the two-dimensional position of the finger, hand or other object on the sensor.

14. The sensor according to claim 5, wherein the sensor
outputs a signal indicating the presence of a finger, hand or other object on the sensor or in the vicinity thereof;
outputs a signal indicating the force exerted by the finger, hand or other object on the sensor; and
outputs a signal indicating an estimation of the two-dimensional position of the finger, hand or other object on the sensor.

15. The sensor of claim 14, wherein the sensor outputs a signal indicating an estimation of the three-dimensional position of the finger, hand or other object on the sensor, based on
the signal indicating an estimation of the two-dimensional position of the finger, hand or other object on the sensor, which provides coordinates x and y; and
the signal indicating an estimation of the force exerted by the finger, hand or other object on the sensor, which provides coordinate z;
wherein coordinates x and y correspond to two distinct directions along the surface of the sensor and coordinate z corresponds a direction perpendicular to the surface of the sensor.

* * * * *